United States Patent
Ai et al.

(10) Patent No.: US 10,733,687 B2
(45) Date of Patent: Aug. 4, 2020

(54) METHOD AND APPARATUS FOR DATA COMMUNICATION IN VIRTUALIZED ENVIRONMENT, AND PROCESSOR

(71) Applicant: Huawei Technologies Co., Ltd., Shenzhen (CN)

(72) Inventors: Chuyue Ai, Shenzhen (CN); Xibao Pang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 96 days.

(21) Appl. No.: 15/281,950

(22) Filed: Sep. 30, 2016

(65) Prior Publication Data

US 2017/0018052 A1    Jan. 19, 2017

Related U.S. Application Data (63) Continuation of application No. PCT/CN2014/074918, filed on Apr. 8, 2014.

(51) Int. Cl.
*G06F 9/30* (2018.01)
*G06T 1/20* (2006.01)
(Continued)

(52) U.S. Cl.
CPC ............ *G06T 1/20* (2013.01); *G06F 9/30098* (2013.01); *G06F 9/30101* (2013.01); *G06F 9/34* (2013.01);
(Continued)

(58) Field of Classification Search
CPC .................................................. G06F 9/30098
See application file for complete search history.

(56) References Cited

U.S. PATENT DOCUMENTS 6,735,756 B1   5/2004 Linn et al.
6,809,735 B1  10/2004 Stauffer et al.
(Continued)

FOREIGN PATENT DOCUMENTS

CN    1980237 A    6/2007
CN  101211309 A    7/2008
(Continued)

OTHER PUBLICATIONS

Foreign Communication From a Counterpart Application, European Application No. 14889172.4, Extended European Search Report dated Sep. 28, 2017, 6 pages.
(Continued)

*Primary Examiner* — Matthew Salvucci
(74) *Attorney, Agent, or Firm* — Conley Rose, P.C.

(57) ABSTRACT

A method for data communication in a virtualized environment is disclosed as follows. A write function of a graphics driver is called by a graphics processing program using a graphics processing interface, where a function in a call process is recorded in a function stack; an entry address of a write function of the graphics processing interface is determined according to an entry address of the write function of the graphics driver and a quantity of layers of the function stack, and an offset and a length that are of a vertex buffer of the graphics processing program are read from the entry address of the write function of the graphics processing interface, so as to determine a data area that is modified by the graphics processing program and is in the vertex buffer, where the modified data area is data necessary for graphics rendering.

20 Claims, 5 Drawing Sheets

(51) Int. Cl.
*G06F 9/451* (2018.01)
*G06F 9/34* (2018.01)
*G06T 1/60* (2006.01)
*G09G 5/00* (2006.01)
*G09G 5/36* (2006.01)

(52) U.S. Cl.
CPC ............... *G06F 9/451* (2018.02); *G06T 1/60* (2013.01); *G09G 5/006* (2013.01); *G09G 5/363* (2013.01); *G09G 2370/00* (2013.01)

(56) References Cited

U.S. PATENT DOCUMENTS

| | | |
|---|---|---|
| 2009/0322776 A1 | 12/2009 | Wall et al. |
| 2012/0084517 A1 | 4/2012 | Post et al. |
| 2012/0139914 A1 | 6/2012 | Jeon |
| 2014/0063028 A1 | 3/2014 | Diard |
| 2014/0282431 A1* | 9/2014 | Delio, Jr. ............ G06F 11/3466 717/130 |
| 2016/0179535 A1* | 6/2016 | Chen .................. G06F 9/30058 712/22 |

FOREIGN PATENT DOCUMENTS

| | | |
|---|---|---|
| CN | 102890643 A | 1/2013 |
| CN | 103294439 A | 9/2013 |
| CN | 103559078 A | 2/2014 |
| CN | 103631634 A | 3/2014 |

OTHER PUBLICATIONS

Machine Translation and Abstract of Chinese Publication No. CN102890643, Jan. 23, 2013, 15 pages.
Jiazi, H., "Analysis of the Acquisition Principle of Function Call," Oct. 15, 2013, 7 pages.
English Translation of Jiazi, H., "Analysis of the Acquisition Principle of Function Call," Oct. 15, 2013, 5 pages.
Foreign Communication From a Counterpart Application, European Application No. 14889172.4, Extended European Search Report dated Apr. 20, 2017, 6 pages.
Foreign Communication From a Counterpart Application, Chinese Application No. 2014800010073, Chinese Search Report dated Mar. 22, 2017, 2 pages.
Foreign Communication From a Counterpart Application, Chinese Application No. 201480001007.3, Chinese Office Action dated Mar. 31, 2017, 3 pages.
Foreign Communication From a Counterpart Application, PCT Application No. PCT/CN2014/074918, English Translation of International Search Report dated Jan. 9, 2015, 3 pages.
Foreign Communication From a Counterpart Application, PCT Application No. PCT/CN2014/074918, English Translation of Written Opinion dated Jan. 9, 2015, 6 pages.
Lehey, G., "Debugging Kernel Problems," XP055469135, Mar. 13, 2004, 99 pages.
"The NT Insider:Stacking the Deck—Finding Your Way Through the Stack," XP055469137, Mar. 11, 2003, 10 pages.
Foreign Communication From a Counterpart Application, European Application No. 14889172.4, European Office Action dated Apr. 30, 2018, 6 pages.

* cited by examiner

METHOD AND APPARATUS FOR DATA COMMUNICATION IN VIRTUALIZED ENVIRONMENT, AND PROCESSOR

CROSS-REFERENCE TO RELATED APPLICATION

This application is a continuation of International Application No. PCT/CN2014/074918, filed on Apr. 8, 2014, the disclosure of which is hereby incorporated by reference in its entirety.

TECHNICAL FIELD

The present disclosure relates to the field of communications technologies, and in particular, to a method and an apparatus for data communication in a virtualized environment, and a processor.

BACKGROUND

In a virtual desktop scenario, there is at least one server and at least one client machine, and a user logs in to a user virtual machine on the server using a virtual desktop client installed on the client machine. A graphics processing program that depends on a graphics processing unit (GPU) for a graphics operation, such as AutoCAD, 3Ds Max, Pro/E, and a three-dimensional (3D) game, may be installed on the virtual machine. When the program runs on the virtual machine, a GPU virtualization technology enables multiple virtual machines to share one physical graphics card to perform a graphics operation, so as to improve utilization efficiency of a hardware resource. Graphics drivers (such as a user mode 3D driver and a kernel mode Windows Display Driver Model (WDDM)) on the user virtual machine acquire graphics instructions (such as a 3D graphics instruction and a two-dimensional (2D) graphics device interface (GDI) instruction) of various software and operating systems, and send the foregoing graphics instructions and data that is used for graphics rendering to a rendering server (Render Server), so that the rendering server invokes a physical GPU to perform instruction rendering and generate a desktop image of the user virtual machine, and sends the generated desktop image of the user virtual machine to the client for display.

In the foregoing process, a large quantity of graphics instructions and data are communicated between the user virtual machine and the rendering server; as a result, a large quantity of communication overheads are generated between the user virtual machine and the rendering server, which reduces efficiency of sharing in the GPU virtualization technology and deteriorates user experience.

SUMMARY

An objective of the present disclosure is to provide a method and an apparatus for data communication in a virtualized environment, and a processor, which are used to improve efficiency of sharing in a GPU virtualization technology and improve user experience.

According to a first aspect, an embodiment of the present disclosure provides a method for data communication in a virtualized environment, including: receiving, by a graphics driver, a driver function call request sent by a graphics processing interface, where the driver function call request is sent by the graphics processing interface after receiving a system function call request sent by a graphics processing program, the system function call request is used to call a write function of the graphics processing interface, the driver function call request is used to call a write function of the graphics driver, an entry address of the write function of the graphics processing interface is stored in a function stack, and an entry address of the write function of the graphics driver is stored in the function stack; determining, by the graphics driver, the entry address of the write function of the graphics processing interface according to the entry address of the write function of the graphics driver and a quantity of layers of the function stack, and reading, from the entry address of the write function of the graphics processing interface, an offset and a length that are of a vertex buffer of the graphics processing program; and sending, by the graphics driver to a rendering server, data in a data area corresponding to the offset and the length that are of the vertex buffer.

In a first possible implementation manner of the first aspect, the determining, by the graphics driver, the entry address of the write function of the graphics processing interface according to the entry address of the write function of the graphics driver and a quantity of layers of the function stack includes: a. reading, according to the entry address of the write function of the graphics driver, a value in an extended base pointer (EBP) register in a central processing unit in which the graphics driver is located, where the value in the EBP register is a stack frame address stored in an immediate-upper-layer function in the function stack; and b. reading a value in the stack frame address stored in the immediate-upper-layer function in the function stack, where the value in the stack frame address stored in the immediate-upper-layer function in the function stack is a stack frame address stored in an upper-layer function immediately following the immediate-upper-layer function in the function stack, and repeatedly executing step b according to the quantity n of layers of the function stack, where a stack frame address obtained after an $(n-1)^{th}$ execution is the entry address of the write function of the graphics processing interface.

With reference to the first aspect or the first implementation manner of the first aspect, in a second possible implementation manner of the first aspect, the method further includes: adding a software interrupt to the write function of the graphics driver; and running a test program to call the write function of the graphics driver, and when the test program calls the write function of the graphics driver using the graphics processing interface and runs and reaches the software interrupt, determining the quantity of layers of the function stack according to a call location of the test program and a location of the software interrupt.

In a third possible implementation manner of the first aspect, before the receiving, by a graphics driver, a driver function call request sent by a graphics processing interface, the method further includes: receiving, by the graphics driver, an application programming interface (API) call request, where the application programming interface call request is sent by the graphics processing program using the graphics processing interface, and the application programming interface call request includes the length of the vertex buffer and a vertex buffer create function; and calling, by the graphics driver according to the length of the vertex buffer, the vertex buffer create function to allocate the vertex buffer to the graphics processing program.

With reference to the first aspect or the third possible implementation manner of the first aspect of the embodiments of the present disclosure, in a fourth possible implementation manner of the first aspect, after the reading an offset and a length that are of a vertex buffer and before the sending, to a rendering server, data in a data area corresponding to the offset and the length that are of the vertex buffer, the method further includes: sending a lock success message to the graphics processing program; and after the graphics processing program completes a data write operation in the vertex buffer, receiving a write end message sent by the graphics processing program, where an area of the write operation is the data area corresponding to the offset and the length that are of the vertex buffer.

In a fifth possible implementation manner of the first aspect, the graphics processing interface is a Window Runtime interface.

In a sixth possible implementation manner of the first aspect, the write function of the graphics processing interface is a windows Lock function.

In a seventh possible implementation manner of the first aspect, the vertex buffer create function is a windows create function.

With reference to the fourth possible implementation manner of the first aspect, in an eighth possible implementation manner, the write end message is used to call an unlock function of the graphics driver.

According to a second aspect, an embodiment of the present disclosure provides an apparatus for data communication in a virtualized environment, including: a receiving module configured to receive a driver function call request sent by a graphics processing interface, where the driver function call request is sent by the graphics processing interface after receiving a system function call request sent by a graphics processing program, the system function call request is used to call a write function of the graphics processing interface, the driver function call request is used to call a write function of the graphics driver, an entry address of the write function of the graphics processing interface is stored in a function stack, and an entry address of the write function of the graphics driver is stored in the function stack; a locating module configured to determine the entry address of the write function of the graphics processing interface according to the entry address of the write function of the graphics driver and a quantity of layers of the function stack, and read, from the entry address of the write function of the graphics processing interface, an offset and a length that are of a vertex buffer of the graphics processing program; and a sending module configured to send, to a rendering server, data in a data area corresponding to the offset and the length that are of the vertex buffer.

In a first possible implementation manner of the second aspect, the locating module includes: a first locating unit configured to read, according to the entry address of the write function of the graphics driver, a value in an EBP register in a central processing unit in which the graphics driver is located, where the value in the EBP register is a stack frame address stored in an immediate-upper-layer function in the function stack; and a second locating unit configured to read a value in the stack frame address stored in the immediate-upper-layer function in the function stack, where the value in the stack frame address stored in the immediate-upper-layer function in the function stack is a stack frame address stored in an upper-layer function immediately following the immediate-upper-layer function in the function stack, and repeatedly execute the reading step of the unit according to the quantity n of layers of the function stack, where a stack frame address obtained after an $(n-1)^{th}$ execution is the entry address of the write function of the graphics processing interface.

In a second possible implementation manner of the second aspect of the embodiments of the present disclosure, the apparatus further includes a commissioning module configured to add a software interrupt to the write function of the graphics driver; and run a test program to call the write function of the graphics driver, and when the test program calls the write function of the graphics driver using the graphics processing interface and runs and reaches the software interrupt, determine the quantity of layers of the function stack according to a call location of the test program and a location of the software interrupt.

In a third possible implementation manner of the second aspect of the embodiments of the present disclosure, the receiving module is further configured to receive an application programming interface call request, where the application programming interface call request is sent by the graphics processing program using the graphics processing interface, and the application programming interface call request includes the length of the vertex buffer and a vertex buffer create function; and the apparatus further includes: a vertex buffer creating module configured to call, according to the length of the vertex buffer, the vertex buffer create function to allocate the vertex buffer to the graphics processing program.

In a fourth possible implementation manner of the second aspect of the embodiments of the present disclosure, the sending module is further configured to send a lock success message to the graphics processing program; and the receiving module is further configured to, after the graphics processing program completes a data write operation in the vertex buffer, receive a write end message sent by the graphics processing program, where an area of the write operation is the data area corresponding to the offset and the length that are of the vertex buffer.

According to a third aspect, an embodiment of the present disclosure provides a processor configured to execute the method in any possible implementation manner of the first aspect.

In the embodiments of the present disclosure, a write function of a graphics driver is called by a graphics processing program using a graphics processing interface, where a function in a call process is recorded in a function stack; an entry address of a write function of the graphics processing interface is determined according to an entry address of the write function of the graphics driver and a quantity of layers of the function stack, and an offset and a length that are of a vertex buffer of the graphics processing program are read from the entry address of the write function of the graphics processing interface, so as to determine a data area that is modified by the graphics processing program and is in the vertex buffer, where the modified data area is data necessary for graphics rendering. A user virtual machine sends only the data necessary for graphics rendering to a rendering server, which avoids unnecessary data transmission, reduces a communication overhead between the user virtual machine and the rendering server, and increases a rendering speed of the rendering server, thereby improving efficiency of sharing in a GPU virtualization technology and improving user experience.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure shall fall within the protection scope of the present disclosure.

Figure 1:
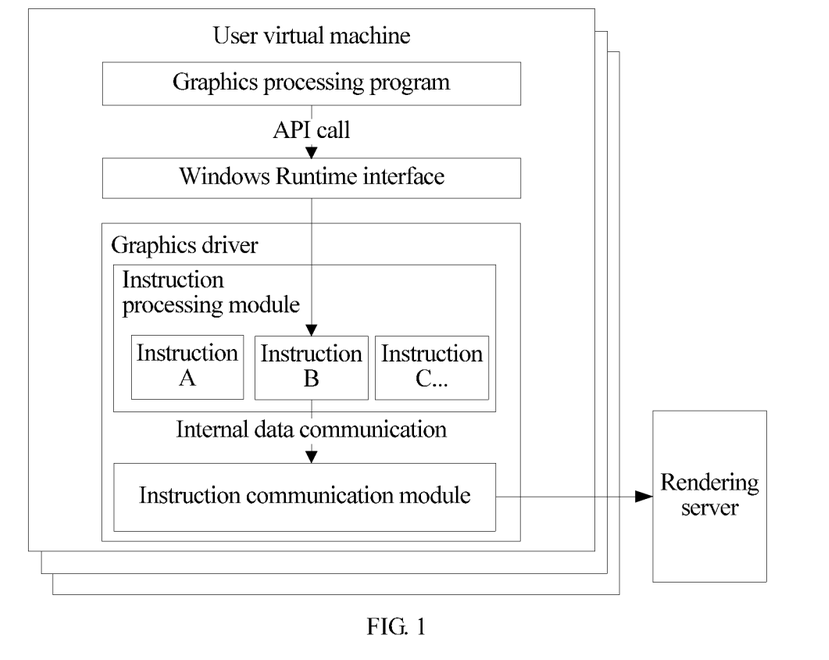
FIG. 1 is a schematic structural diagram of a hierarchy for calling a graphics processing instruction by a user virtual machine according to an embodiment of the present disclosure.

FIG. 1 is a schematic structural diagram of a hierarchy for calling a graphics processing instruction by a user virtual machine according to an embodiment of the present disclosure. When a graphics processing program of a user calls a graphics processing API using a Windows Runtime interface, the graphics processing program sends an API call request to the Windows Runtime interface, and the Windows Runtime interface calls an instruction processing function downwards using a called thread, where the instruction processing function is registered with a graphics driver, and specifically, the instruction processing function corresponds to a call instruction sent by the graphics processing program to the Windows Runtime interface. As shown in FIG. 1, an instruction processing module logically exists in the graphics driver; an instruction A, an instruction B, an instruction C, and the like each correspond to a different instruction processing function; and the Windows Runtime interface calls, according to a call instruction sent by the graphics processing program, a corresponding instruction processing function in the graphics driver, such as a Create function and an unlock function.

In the prior art, a graphics processing program sends a graphics processing instruction to a graphics driver using a Windows Runtime interface, where the graphics processing instruction carries call information indicating a data write area. Due to a limitation of the Windows Runtime interface, after a process of calling a series of windows system functions, the Windows Runtime interface cannot forward the foregoing call information to the graphics driver; as a result, the graphics driver cannot correctly identify which data is used for the graphics processing instruction and which data is modified by a user in data related to current rendering. A user virtual machine can only transmit all the data related to the current rendering (data in a vertex buffer) to a rendering server for rendering, and such a transmission manner results in a large quantity of communication overheads generated between the user virtual machine and the rendering server.

In this embodiment of the present disclosure, with a stack trace technology, call information used by a graphics processing program for calling an API is acquired using a Windows Runtime interface, data necessary for graphics rendering is determined according to the acquired call information, and a user virtual machine sends only the data necessary for graphics rendering to a rendering server, which avoids unnecessary data transmission, reduces a communication overhead between the user virtual machine and the rendering server, and increases a rendering speed of the rendering server, thereby improving efficiency of GPU sharing and improving user experience.

Figure 2:
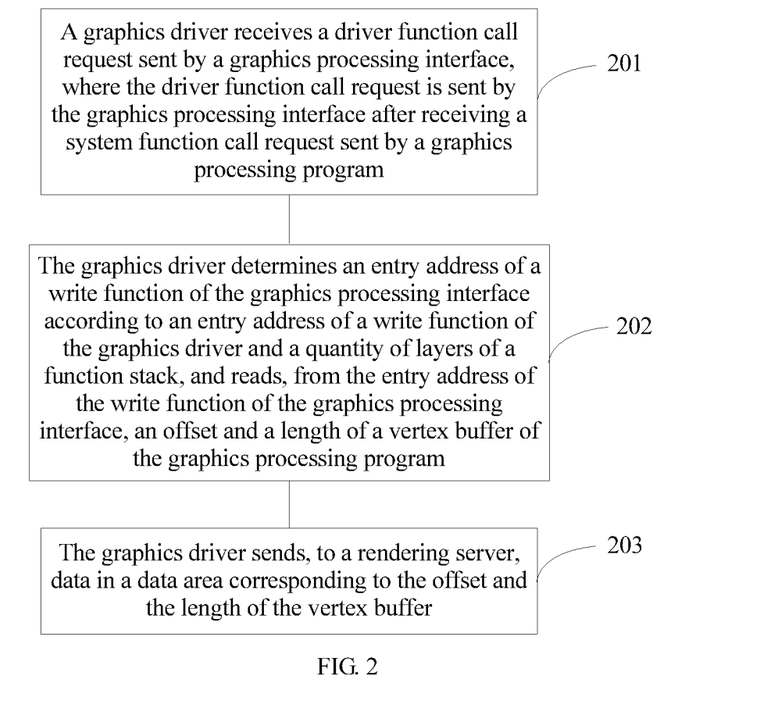
FIG. 2 is a schematic flowchart of a method for data communication in a virtualized environment according to an embodiment of the present disclosure.

FIG. 2 is a schematic flowchart of a method for data communication in a virtualized environment according to an embodiment of the present disclosure, where the method includes the following steps:

Step 201: A graphics driver receives a driver function call request sent by a graphics processing interface, where the driver function call request is sent by the graphics processing interface after receiving a system function call request sent by a graphics processing program, the system function call request is used to call a write function of the graphics processing interface, the driver function call request is used to call a write function of the graphics driver, an entry address of the write function of the graphics processing interface is stored in a function stack, and an entry address of the write function of the graphics driver is stored in the function stack.

Step 202: The graphics driver determines the entry address of the write function of the graphics processing interface according to the entry address of the write function of the graphics driver and a quantity of layers of the function stack, and reads, from the entry address of the write function of the graphics processing interface, an offset and a length that are of a vertex buffer of the graphics processing program.

Step 203: The graphics driver sends, to a rendering server, data in a data area corresponding to the offset and the length that are of the vertex buffer.

In this embodiment of the present disclosure, a write function of a graphics driver is called by a graphics processing program using a graphics processing interface, where a function in a call process is recorded in a function stack; an entry address of a write function of the graphics processing interface is determined according to an entry address of the write function of the graphics driver and a quantity of layers of the function stack, and an offset and a length that are of a vertex buffer of the graphics processing program are read from the entry address of the write function of the graphics processing interface, so as to determine a data area that is modified by the graphics processing program and is in the vertex buffer, where the modified data area is data necessary for graphics rendering. A user virtual machine sends only the data necessary for graphics rendering to a rendering server, which avoids unnecessary data transmission, reduces a communication overhead between the user virtual machine and the rendering server, and increases a rendering speed of the rendering server, thereby improving efficiency of sharing in a GPU virtualization technology and improving user experience.

Further, assuming that the determined quantity of layers of the function stack is n, that the graphics driver determines the entry address of the write function of the graphics processing interface according to the entry address of the write function of the graphics driver and the quantity of layers of the function stack includes: a. reading, according to the entry address of the write function of the graphics driver, a value in an extended base pointer EBP register in a central processing unit in which the graphics driver is located, where the value in the EBP register is a stack frame address stored in an immediate-upper-layer function in the function stack; and b. reading a value in the stack frame address stored in the immediate-upper-layer function in the function stack, where the value in the stack frame address stored in the immediate-upper-layer function in the function stack is a stack frame address stored in an upper-layer function immediately following the immediate-upper-layer function in the function stack, and repeatedly executing step b according to the quantity n of layers of the function stack, where a stack frame address obtained after an $(n-1)^{th}$ execution is the entry address of the write function of the graphics processing interface.

Figure 4:
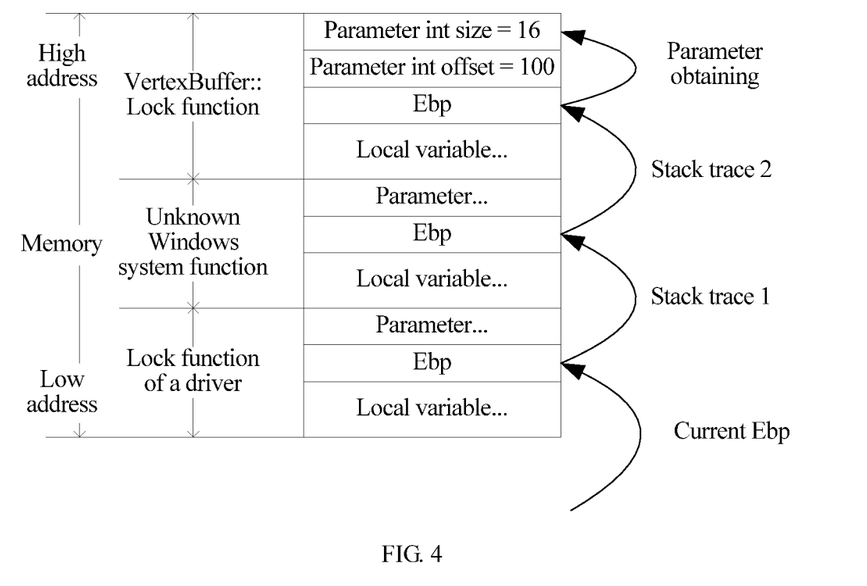
FIG. 4 is a schematic diagram of function stack distribution in system memory according to an embodiment of the present disclosure.

The foregoing technology in which the entry address of the write function of the graphics processing interface is determined according to the entry address of the write function of the graphics driver and the quantity of layers of the function stack may be referred to as a stack trace technology; for details, reference may be made to FIG. 4 and descriptions in FIG. 4.

In a specific implementation manner of this embodiment of the present disclosure, the quantity of layers of the function stack may be determined in the following manner: adding a software interrupt to the write function of the graphics driver; and running a test program to call the write function of the graphics driver, and when the test program calls the write function of the graphics driver using the graphics processing interface and runs and reaches the software interrupt, determining the quantity of layers of the function stack according to a call location of the test program and a location of the software interrupt.

It should be noted that, the test program may be any commonly used graphics processing program.

In the foregoing process of determining the quantity of layers of the function stack, in this embodiment of the present disclosure, the software interrupt is added to the write function of the graphics driver, and the test program calls the write function of the graphics driver using the graphics processing interface; when the program runs and reaches the software interrupt in the write function, the program suspends; in this case, a windbg tool may be run, and the function stack may be printed and the quantity of layers may be observed, where the function stack is called in the process from the test program to the graphics processing interface and then to the write function of the graphics driver. The call location of the test program is a function call location at which the test program sends an API call request to the graphics processing interface, and the location of the software interrupt is a call location of the write function of the graphics driver, where a total quantity of layers of a called function stack between the foregoing two locations (including the two locations themselves) is a quantity of layers of a function stack between the call location of the test program and the location of the software interrupt. Generally, functions involved in the foregoing function stack include at least a function called in a process from the graphics processing program to the graphics processing interface, a windows internal called function, and a function called by a windows module from the graphics driver.

In this embodiment of the present disclosure, a software interrupt is added to a write function of a graphics driver; a quantity of layers of a function stack is determined according to a call location of a test program and a location of the software interrupt; a stack trace technology is used according to the determined quantity of layers of the function stack, so as to determine a parameter used by a graphics processing program for calling an API, and then determine a data area that is modified by the graphics processing program and is in a vertex buffer, where the modified data area is data necessary for graphics rendering. A user virtual machine sends only the data necessary for graphics rendering to a rendering server, which avoids unnecessary data transmission, reduces a communication overhead between the user virtual machine and the rendering server, and increases a rendering speed of the rendering server, thereby improving efficiency of GPU sharing and improving user experience.

Figure 3:
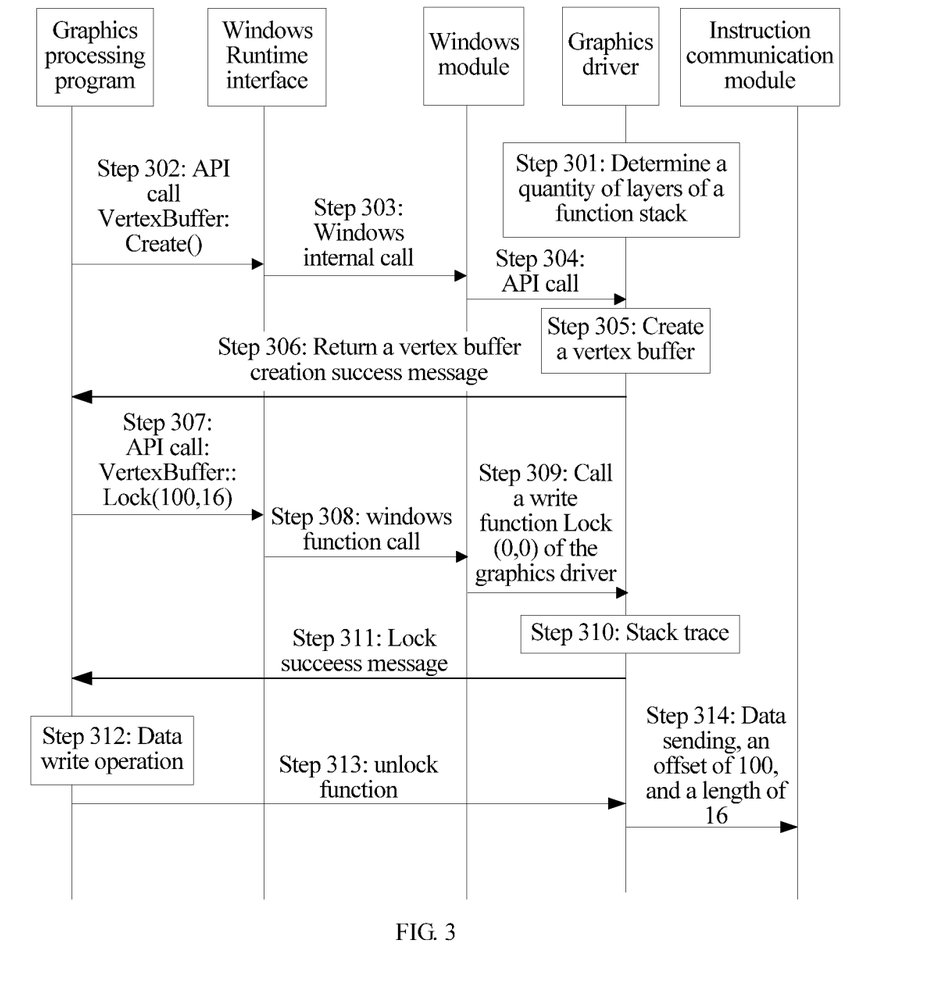
FIG. 3 is a schematic flowchart of another method for data communication in a virtualized environment according to an embodiment of the present disclosure.

FIG. 3 is a schematic flowchart of another method for data communication in a virtualized environment according to an embodiment of the present disclosure. In this embodiment, a typical D3D9 API call is used as an example for description. In this embodiment, a Windows Runtime interface is used as an example of a graphics processing interface for description.

Step 301: In a development process of a graphics driver, add a software interrupt to a write function of the graphics driver; run a test program to call the write function of the graphics driver using the Windows Runtime interface; and when the test program runs and reaches the software interrupt, run a commissioning tool, and determine a quantity of layers of a function stack according to a call location of the test program and a location of the software interrupt.

The test program suspends when the test program runs and reaches the software interrupt; in this case, a commissioning tool (for example, windbg) is run to print a function stack called in a test process, and a situation of a function stack currently called may be observed; and a quantity of layers of a function stack between the location of the software interrupt and the call location of the test program is recorded and used as a quantity of layers for a subsequent stack trace.

Step 302: A graphics processing program sends an API call request to the Windows Runtime interface, where the API call request includes a length of a vertex buffer and a vertex buffer create function, and is used to apply to the graphics driver for a vertex buffer required for graphics processing.

The graphics processing program may call a CreateResource function (also referred to as a Create function) in a VertexBuffer class in a graphics driver of in user mode to create the vertex buffer.

Step 303: The Windows Runtime interface receives the API call request sent by the graphics processing program, and calls a series of Windows modules to perform system internal logic processing.

It should be noted that, which Windows modules are specifically called in this step is determined according to a called function, and the determining may be performed according to an existing operating manner of a Windows function stack, which is not limited in this embodiment of the present disclosure. When a function called according to the API call request is a CreateResource function, internal logic processing of a Windows module is performed according to existing system logic, and a Windows module and a specific process that are involved in the logic processing are executed according to an existing processing manner, which is not limited in this embodiment of the present disclosure.

Step 304: A called Windows module performs, according to windows standard specifications, processing on the call request from the graphics processing program, and sends the API call request to the graphics driver using an interface of the graphics driver in user mode, where the API call request includes the length of the vertex buffer and the vertex buffer create function.

The Windows module calls a CreateResource( ) function from the graphics driver, so as to instruct the graphics driver to create the vertex buffer.

Step 305: The graphics driver receives the API call request, and calls, according to the length of the vertex buffer, the vertex buffer create function to allocate, in a context of the graphics driver itself, the vertex buffer to the graphics processing program; and performs operations such as allocating memory to the vertex buffer.

Step 306: The graphics driver sends a vertex buffer creation success message to the graphics processing program using the Windows module and the Windows Runtime interface. The graphics driver may use the vertex buffer creation success message to carry a handle of the vertex buffer and return it to the graphics software.

It should be noted that, Steps 302 to 306 describe a process in which the graphics processing program applies, to the graphics driver using the Windows Runtime interface, to create the vertex buffer. Another vertex buffer creating manner existing in the prior art may replace the foregoing vertex buffer creating manner in this embodiment of the present disclosure.

Step 307: After receiving the vertex buffer creation success message, the graphics processing program sends a system function call request to the Windows Runtime interface, where the system function call request is used to call a write function of the graphics processing interface, the system function call request carries information such as an offset and the length that are of the vertex buffer, the offset is a start address of to-be-written data, the length is a length of data that starts to be written from the start address, and an entry address of the write function of the graphics processing interface is stored in the function stack.

The write function of the graphics processing interface is a VertexBuffer::Lock( ) function.

Step 308: The Windows Runtime interface receives the system function call request, and calls a windows module to perform Windows internal logic processing on the system function call request.

It should be noted that, after the Windows Runtime interface receives the system function call request from the graphics processing program, the function stack starts here to enter system internal logic, and the Windows Runtime interface then calls a series of Windows modules, where these modules may implement specific processes and functions according to standard specifications in the prior art, which is not limited in the present disclosure.

Step 309: The Windows Runtime interface sends a driver function call request to the graphics driver using the Windows module, where the driver function call request is used to call the write function of the graphics driver, and an entry address of the write function of the graphics driver is stored in the function stack.

The driver function call request may be specifically implemented by calling the write function of the graphics driver. The write function of the graphics driver is a lock function of the graphics driver.

It should be noted that, in the driver function call request in this step, because the internal processing logic of the windows module is performed in the foregoing step, the driver function call request sent from the Windows module cannot carry the offset and the length that are of the vertex buffer; therefore, in this case, the graphics driver cannot obtain a specific location and a specific length that are of vertex buffer data modified by the graphics processing program. In the prior art, if an offset and a length that are of a vertex buffer that are transmitted from a graphics application are lacked, a graphics driver simulates a working manner of a physical graphics card driver, and by default, data areas in the entire vertex buffer are sent to a rendering server using an instruction communication module, which causes a large amount of redundant data transmission.

It should be noted that, a memory area allocated to the vertex buffer by the graphics driver is generally large, for example, is 1M. In a process of a single data write by the graphics processing program, a size of data written to the allocated memory is generally small, for example, assuming that a total size of the vertex buffer applied for by the graphics processing program is 1M. When the graphics processing program calls the write function of the graphics processing interface to perform drawing, assuming that call information in the write function of the graphics processing interface is (100, 16), that is, the offset is 100 and the length is 16, the call information (100, 16) indicates that data of a 16-byte length at an offset of a $100^{th}$ byte is to be updated in the vertex buffer. In a conventional method, to perform this rendering, a user virtual machine needs to send data (1M) in all the data areas in the vertex buffer to the rendering server. However, because actually changed data is only the data of the 16-byte length at the offset of the $100^{th}$ byte in a data area, the conventional method causes a large quantity of communication overheads.

Step 310: The graphics driver receives the driver function call request that is sent by the Windows Runtime interface using the windows module, and determines that the driver function call request is that the graphics processing program needs to write data into the created vertex buffer. The graphics driver determines the entry address of the write function of the graphics processing interface according to the quantity, determined in step 301, of layers of the function stack, and reads, from the entry address of the write function of the graphics processing interface, the offset and the length that are of the vertex buffer of the graphics processing program.

That the graphics driver determines the entry address of the write function of the graphics processing interface according to the entry address of the write function of the graphics driver and the quantity of layers of the function stack includes two processes: a. reading, according to the entry address of the write function of the graphics driver, a value in an extended base pointer EBP register in a central processing unit in which the graphics driver is located, where the value in the EBP register is a stack frame address stored in an immediate-upper-layer function in the function stack; and b. reading a value in the stack frame address stored in the immediate-upper-layer function in the function stack, where the value in the stack frame address stored in the immediate-upper-layer function in the function stack is a stack frame address stored in an upper-layer function immediately following the immediate-upper-layer function in the function stack, and repeatedly executing step b according to the quantity n of layers of the function stack, where a stack frame address obtained after an $(n-1)^{th}$ execution is the entry address of the write function of the graphics processing interface.

After acquiring the entry address of the write function of the graphics processing interface, the graphics driver reads, from the entry address of the write function of the graphics processing interface, the offset and the length that are of the vertex buffer. A data area corresponding to the offset and the length that are of the vertex buffer is an area that is applied for by the graphics processing program and into which the data is to be written.

In such a manner, an original parameter transmitted from the graphics processing program when the graphics processing program calls the VertexBuffer::Lock( ) function of the Windows Runtime interface may be obtained.

FIG. 4 is a schematic structural diagram of function stack distribution in system memory according to an embodiment of the present disclosure. This embodiment of the present disclosure uses FIG. 4 as an example to describe a quantity of layers of a function stack and a specific stack trace process.

Description about the quantity of layers of the function stack is as follows: The first layer of the function stack is a VertexBuffer::lock function called by a graphics processing program from a Windows Runtime interface; the last layer is a called Lock function of a graphics driver; and intermediate layers are windows system functions, where a quantity of layers of the windows system functions at the intermediate layers is determined according to a quantity of windows system functions called in a program execution process.

Description about the specific stack trace process is as follows:

In this example, a write function of the graphics processing interface is a VertexBuffer::lock function, and a system function called by a Windows module is determined according to existing Windows call logic, which is not limited in the present disclosure.

In process a, the graphics driver traces back to a current EBP, where a value read from an address of the current EBP is a stack frame address stored in an immediate-upper-layer Windows system function.

In process b, the graphics driver reads a value in the stack frame address stored in the immediate-upper-layer Windows system function in the function stack. It should be noted that, there may be multiple Windows system functions, and it is only required to trace back to an uppermost-layer Windows system function according to the quantity of layers. A value read from a stack frame address stored in the uppermost-layer Windows system function is an entry address of the write function of the graphics processing interface. An offset and a length that are of a vertex buffer are read from the entry address of the write function of the graphics processing interface, that is, a parameter (100, 16) is obtained. After the parameter (100, 16) is obtained, it can be determined that only a segment of information of a 16-byte length at an offset of a $100^{th}$ byte in a data area in the vertex buffer is updated in this call, and only the 16 bytes are sent to an instruction communication module. As shown FIG. 4, when there are three layers in the function stack, a quantity of times required for executing the process b is 2.

Further, it should be noted that, an EBP register is one of general registers on an X86 central processing unit (CPU); and when advanced languages such as C and C++ run, the EBP register automatically stores a stack frame address of a latest function each time a function call is performed. Therefore, a return address (stack frame address stored in an immediate-upper-layer function) of a current-layer function is above an address pointed to by the EBP register, and data such as a local variable of the current-layer function is under the address pointed to by the EBP register.

Step 311: The graphics driver sends a lock success message to the graphics processing program.

Step 312: The graphics processing program performs a write in a data area corresponding to the offset and the length that are of the vertex buffer.

Step 313: After the write is completed, the graphics processing program sends a write end message to the graphics driver.

The graphics processing program may notify, by calling an Unlock function using the Windows Runtime interface, the graphics driver that the write ends.

Step 314: The graphics driver sends, to an instruction communication module, data in the data area corresponding to the offset and the length that are of the vertex buffer, and the instruction communication module packetizes and sends the obtained data to a rendering server for rendering processing.

In this embodiment of the present disclosure, a software interrupt is added to a write function of a graphics driver; a quantity of layers of a function stack is determined according to a call location of a test program and a location of the software interrupt; a stack trace technology is used according to the determined quantity of layers of the function stack, so as to determine a parameter used by a graphics processing program for calling an API, and then determine a data area that is modified by the graphics processing program and is in a vertex buffer, where the modified data area is data necessary for graphics rendering. A user virtual machine sends only the data necessary for graphics rendering to a rendering server, which avoids unnecessary data transmission, reduces a communication overhead between the user virtual machine and the rendering server, and increases a rendering speed of the rendering server, thereby improving efficiency of GPU sharing and improving user experience.

Figure 5:
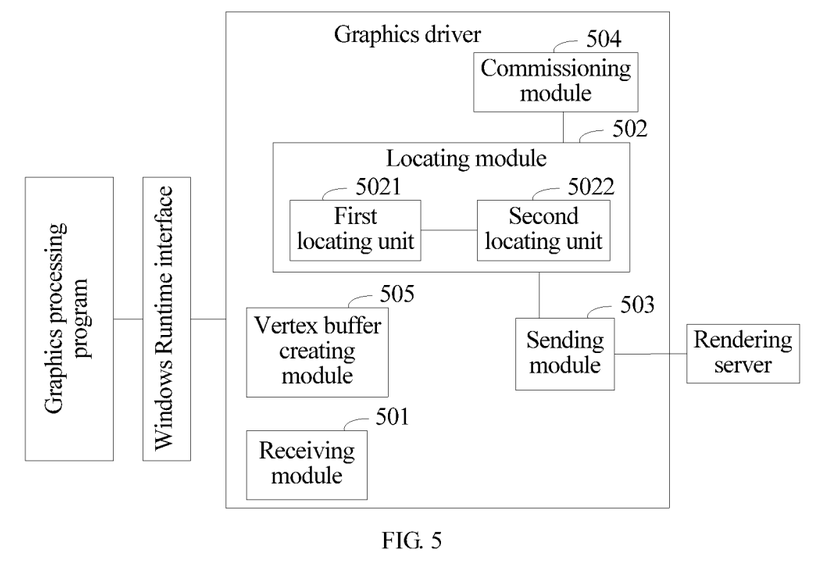
FIG. 5 is a schematic structural diagram of an apparatus for data communication in a virtualized environment according to an embodiment of the present disclosure.

Corresponding to the foregoing method embodiments, FIG. 5 is a schematic structural diagram of an apparatus for data communication in a virtualized environment according to an embodiment of the present disclosure, where the apparatus includes: a receiving module 501 configured to receive a driver function call request sent by a graphics processing interface, where the driver function call request is sent by the graphics processing interface after receiving a system function call request sent by a graphics processing program, the system function call request is used to call a write function of the graphics processing interface, the driver function call request is used to call a write function of the graphics driver, an entry address of the write function of the graphics processing interface is stored in a function stack, and an entry address of the write function of the graphics driver is stored in the function stack; a locating module 502 configured to determine the entry address of the write function of the graphics processing interface according to the entry address of the write function of the graphics driver and a quantity of layers of the function stack, and read, from the entry address of the write function of the graphics processing interface, an offset and a length that are of a vertex buffer of the graphics processing program; and a sending module 503 configured to send, to a rendering server, data in a data area corresponding to the offset and the length that are of the vertex buffer.

In this embodiment of the present disclosure, a write function of a graphics driver is called by a graphics processing program using a graphics processing interface, where a function in a call process is recorded in a function stack; an entry address of a write function of the graphics processing interface is determined according to an entry address of the write function of the graphics driver and a quantity of layers of the function stack, and an offset and a length that are of a vertex buffer of the graphics processing program are read from the entry address of the write function of the graphics processing interface, so as to determine a data area that is modified by the graphics processing program and is in the vertex buffer, where the modified data area is data necessary for graphics rendering. A user virtual machine sends only the data necessary for graphics rendering to a rendering server, which avoids unnecessary data transmission, reduces a communication overhead between the user virtual machine and the rendering server, and increases a rendering speed of the rendering server, thereby improving efficiency of sharing in a GPU virtualization technology and improving user experience.

Further, the locating module 502 includes: a first locating unit 5021 configured to read, according to the entry address of the write function of the graphics driver, a value in an extended base pointer EBP register in a central processing unit in which the graphics driver is located, where the value in the EBP register is a stack frame address stored in an immediate-upper-layer function in the function stack; and a second locating unit 5022 configured to read a value in the stack frame address stored in the immediate-upper-layer function in the function stack, where the value in the stack frame address stored in the immediate-upper-layer function in the function stack is a stack frame address stored in an upper-layer function immediately following the immediate-upper-layer function in the function stack, and repeatedly execute the reading step of the unit according to the quantity n of layers of the function stack, where a stack frame address obtained after an $(n-1)^{th}$ execution is the entry address of the write function of the graphics processing interface.

The apparatus shown in FIG. 5 further includes: a commissioning module 504 configured to add a software interrupt to the write function of the graphics driver; and run a test program to call the write function of the graphics driver, and when the test program calls the write function of the graphics driver using the graphics processing interface and runs and reaches the software interrupt, determine the quantity of layers of the function stack according to a call location of the test program and a location of the software interrupt.

Further, the receiving module 501 is further configured to receive an application programming interface call request, where the application programming interface call request is sent by the graphics processing program using the graphics processing interface, and the application programming interface call request includes the length of the vertex buffer and a vertex buffer create function.

The apparatus further includes a vertex buffer creating module 505 configured to call, according to the length of the vertex buffer, the vertex buffer create function to allocate the vertex buffer to the graphics processing program.

The sending module 503 is further configured to send a lock success message to the graphics processing program.

The receiving module 501 is further configured to, after the graphics processing program completes a data write operation in the vertex buffer, receive a write end message sent by the graphics processing program, where an area of the write operation is the data area corresponding to the offset and the length that are of the vertex buffer.

Figure 6:
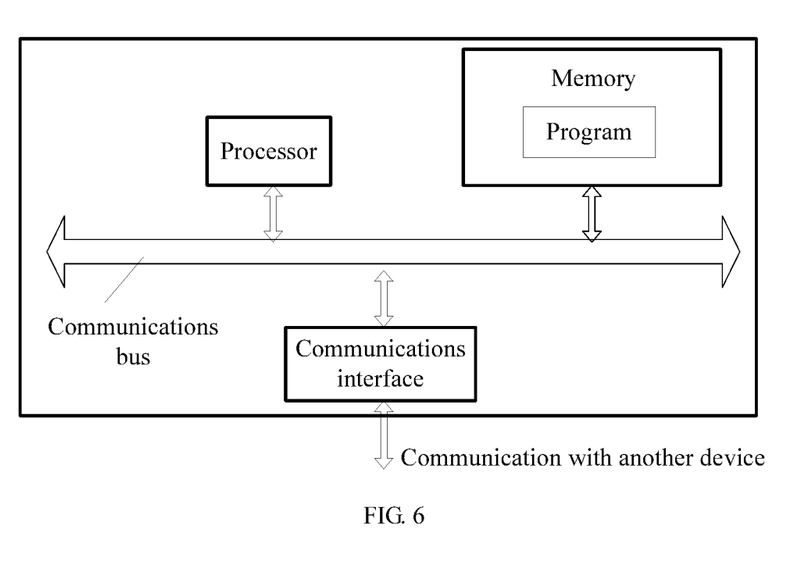
FIG. 6 is a schematic structural diagram of hardware for data communication in a virtualized environment according to an embodiment of the present disclosure.

Further, FIG. 6 is a schematic structural diagram of hardware for data communication in a virtualized environment according to an embodiment of the present disclosure, where the hardware may be specifically a server, including at least one processor (for example, a CPU), at least one network interface or other communications interface, a memory, and at least one communications bus, which is configured to implement connections and communication between these apparatuses. The processor is configured to execute an executable module, such as a computer program, stored in the memory. The memory may include a high-speed random access memory (RAM), or may include a non-volatile memory, for example, at least one magnetic disk memory. A communication connection between the server and at least one other network element is implemented using at least one network interface (which may be wired or wireless), where the Internet, a wide area network, a local area network, a metropolitan area network, and the like may be used.

In some implementation manners, the memory stores a program instruction, and the program instruction may be executed by the processor, where the program instruction may include units described in the foregoing embodiment of the present disclosure. For specific implementation manners of the units, reference may be made to corresponding content in the foregoing embodiment of the present disclosure, and details are not described herein again.

According to the method and apparatus for data communication in a virtualized environment and the processor that are provided in the embodiments of the present disclosure, a software interrupt is added to a write function; a quantity of layers of a function stack is determined according to a call location of a test program and a location of the software interrupt; a stack trace technology is used according to the determined quantity of layers of the function stack, so as to determine a parameter used by a graphics processing program for calling an API, and then determine a data area that is modified by the graphics processing program and is in a vertex buffer, where the modified data area is data necessary for graphics rendering. A user virtual machine sends only the data necessary for graphics rendering to a rendering server, which avoids unnecessary data transmission, and reduces a communication overhead between the user virtual machine and the rendering server, thereby improving efficiency of GPU sharing and improving user experience.

According to the descriptions of the foregoing method embodiments, a person skilled in the art may clearly understand that some or all steps of the methods in the foregoing embodiments may be implemented by software in addition to a necessary universal hardware platform. Based on such an understanding, the technical solutions of the present disclosure essentially or the part contributing to the prior art may be implemented in a form of a software product. The software product may be stored in a storage medium, such as a read-only memory (ROM)/RAM, a magnetic disk, or an optical disc, and includes several instructions for instructing a computer device (which may be a personal computer, a server, or a network communication device such as media gateway) to perform the methods described in the embodiments or some parts of the embodiments of the present disclosure.

It should be noted that the embodiments in this specification are all described in a progressive manner, for same or similar parts in the embodiments, reference may be made to these embodiments, and each embodiment focuses on a difference from other embodiments. Especially, device and system embodiments are basically similar to a method embodiment, and therefore are described briefly; for related parts, reference may be made to descriptions in the part of the method embodiment. The described device and system embodiments are merely exemplary. The units described as separate parts may or may not be physically separate, and parts displayed as units may or may not be physical units, may be located in one position, or may be distributed on multiple network units. Some or all of the modules may be selected according to actual needs to achieve the objectives of the solutions of the embodiments. A person of ordinary skill in the art may understand and implement the embodiments of the present disclosure without creative efforts.

The foregoing descriptions are merely exemplary embodiments of the present disclosure, but are not intended to limit the protection scope of the present disclosure. Any modification, equivalent replacement, or improvement made without departing from the spirit and principle of the present disclosure shall fall within the protection scope of the present disclosure.

What is claimed is:

1. A method for data communication in a virtualized environment in which multiple user virtual machines share a graphics processing unit of a rendering server, the method comprising performing the following steps in at least one of the multiple user virtual machines:

receiving, by a graphics driver, a driver function call request from a graphics processing interface, the driver function call request being sent by the graphics processing interface after receiving a system function call request from a graphics processing program, the system function call request calling a write function of the graphics processing interface, the driver function call request calling a write function of the graphics driver, and an entry address of the write function of the graphics processing interface being stored in a function stack;

reading, by the graphics driver, according to an entry address of the write function of the graphics driver, a value in an extended base pointer (EBP) register in a central processing unit (CPU) in which the graphics driver is located, the value in the EBP register being a stack frame address stored in an immediate-upper-layer function immediately following a lowest layer function of the function stack;

reading, by the graphics driver, a value in the stack frame address stored in the immediate-upper-layer function in the function stack, the value in the stack frame address stored in the immediate-upper-layer function in the function stack being a stack frame address stored in an upper-layer function immediately following the immediate-upper-layer function in the function stack, and repeatedly reading the value in a first stack frame address and replacing the first stack frame address with the value in the first stack frame address (n−1) times according to a quantity n of layers of the function stack, and a stack frame address obtained after an $(n-1)^{th}$ execution being the entry address of the write function of the graphics processing interface;

reading, by the graphics driver and from the entry address of the write function of the graphics processing interface, an offset and a length that are of a vertex buffer of the graphics processing program; and sending, by the graphics driver to the rendering server, data in a data area corresponding to the offset and the length that are of the vertex buffer.

2. The method of claim 1, further comprising:
adding a software interrupt to the write function of the graphics driver;
running a test program to call the write function of the graphics driver; and
determining the quantity n of layers of the function stack according to a call location of the test program and a location of the software interrupt when the test program calls the write function of the graphics driver using the graphics processing interface and reaches the software interrupt.

3. The method of claim 1, wherein before receiving the driver function call request from the graphics processing interface, the method further comprises:
receiving, by the graphics driver, an application programming interface call request, the application programming interface call request being sent by the graphics processing program using the graphics processing interface, and the application programming interface call request comprising the length of the vertex buffer and a vertex buffer create function; and
calling, by the graphics driver according to the length of the vertex buffer, the vertex buffer create function to allocate the vertex buffer to the graphics processing program.

4. The method of claim 3, wherein the vertex buffer create function is a Windows create function.

5. The method of claim 1, wherein after reading the offset and the length that are of the vertex buffer and before sending the data in the data area corresponding to the offset and the length that are of the vertex buffer, the method further comprises:
sending a lock success message to the graphics processing program; and
receiving a write end message from the graphics processing program after the graphics processing program completes a data write operation in the vertex buffer, an area of the data write operation being the data area corresponding to the offset and the length that are of the vertex buffer.

6. The method of claim 5, wherein the write end message calls an unlock function of the graphics driver.

7. The method of claim 1, wherein the graphics processing interface is a Windows Runtime interface, and the write function of the graphics processing interface is a Windows Lock function.

8. The method of claim 1, wherein an entry address of the write function of the graphics driver is stored in the function stack.

9. A device comprising:
a processor; and
a non-transitory computer-readable medium coupled to the processor and storing programming instructions for execution by the processor, the programming instructions instructing the processor to control a graphics driver to perform the following steps in at least one of multiple user virtual machines sharing a graphics processing unit of a rendering server:
receive a driver function call request from a graphics processing interface, the driver function call request being sent by the graphics processing interface after receiving a system function call request from a graphics processing program, the system function call request calling a write function of the graphics processing interface, the driver function call request calling a write function of the graphics driver, and an entry address of the write function of the graphics processing interface being stored in a function stack;
read according to an entry address of the write function of the graphics driver, a value in an extended base pointer (EBP) register in a central processing unit (CPU) in which the graphics driver is located, the value in the EBP register being a stack frame address stored in an immediate-upper-layer function immediately following a lowest layer function of the function stack;

read a value in the stack frame address stored in the immediate-upper-layer function in the function stack, the value in the stack frame address stored in the immediate-upper-layer function in the function stack being a stack frame address stored in an upper-layer function immediately following the immediate-upper-layer function in the function stack, and repeatedly reading the value in a first stack frame address and replacing the first stack from address with the value in the first stack frame address (n−1) times according to a quantity n of layers of the function stack, and a stack frame address obtained after an $(n-1)^{th}$ execution being the entry address of the write function of the graphics processing interface;

read, from the entry address of the write function of the graphics processing interface, an offset and a length that are of a vertex buffer of the graphics processing program; and send, to the rendering server, data in a data area corresponding to the offset and the length that are of the vertex buffer.

10. The device of claim 9, wherein the programming instructions further instruct the processor to:

add a software interrupt to the write function of the graphics driver;

run a test program to call the write function of the graphics driver; and determine the quantity n of layers of the function stack according to a call location of the test program and a location of the software interrupt when the test program calls the write function of the graphics driver using the graphics processing interface and reaches the software interrupt.

11. The device of claim 9, wherein the programming instructions further instruct the processor to:

receive an application programming interface call request, the application programming interface call request being sent by the graphics processing program using the graphics processing interface, and the application programming interface call request comprising the length of the vertex buffer and a vertex buffer create function; and call, according to the length of the vertex buffer, the vertex buffer create function to allocate the vertex buffer to the graphics processing program.

12. The device of claim 9, wherein the programming instructions instruct the processor to:

send a lock success message to the graphics processing program; and receive a write end message from the graphics processing program after the graphics processing program completes a data write operation in the vertex buffer, an area of the data write operation being the data area corresponding to the offset and the length that are of the vertex buffer.

13. The device of claim 9, wherein an entry address of the write function of the graphics driver is stored in the function stack.

14. A computer program product comprising computer-executable instructions for storage on a non-transitory computer-readable medium that, when executed by a processor, cause an apparatus to control a graphics driver to perform the following steps in at least one of multiple user virtual machines sharing a graphics processing unit of a rendering server:

receive a driver function call request from a graphics processing interface, the driver function call request being sent by the graphics processing interface after receiving a system function call request from a graphics processing program, the system function call request calling a write function of the graphics processing interface, the driver function call request calling a write function of the graphics driver, and an entry address of the write function of the graphics processing interface being stored in a function stack;

read according to an entry address of the write function of the graphics driver, a value in an extended base pointer (EBP) register in a central processing unit (CPU) in which the graphics driver is located, the value in the EBP register being a stack frame address stored in an immediate-upper-layer function immediately following a lowest layer function of the function stack;

read a value in the stack frame address stored in the immediate-upper-layer function in the function stack, the value in the stack frame address stored in the immediate-upper-layer function in the function stack being a stack frame address stored in an upper-layer function immediately following the immediate-upper-layer function in the function stack, and repeatedly reading the value in a first stack frame address and replacing the first stack frame address with the value in the first stack frame address (n−1) times according to a quantity n of layers of the function stack, and a stack frame address obtained after an $(n-1)^{th}$ execution being the entry address of the write function of the graphics processing interface;

read, from the entry address of the write function of the graphics processing interface, an offset and a length that are of a vertex buffer of the graphics processing program; and send, to the rendering server, data in a data area corresponding to the offset and the length that are of the vertex buffer.

15. The computer program product of claim 14, wherein the instructions instruct the apparatus to:

add a software interrupt to the write function of the graphics driver;

run a test program to call the write function of the graphics driver; and determine the quantity n of layers of the function stack according to a call location of the test program and a location of the software interrupt when the test program calls the write function of the graphics driver using the graphics processing interface and reaches the software interrupt.

16. The computer program product of claim 14, wherein the instructions further instruct the apparatus to receive an application programming interface call request, the application programming interface call request being sent by the graphics processing program using the graphics processing interface, and the application programming interface call request comprising the length of the vertex buffer and a vertex buffer create function.

17. The computer program product of claim 16, wherein the instructions further instruct the apparatus to call, according to the length of the vertex buffer, the vertex buffer create function to allocate the vertex buffer to the graphics processing program.

18. The computer program product of claim 14, wherein the instructions further instruct the apparatus to send a lock success message to the graphics processing program.

19. The computer program product of claim 18, wherein the instructions further instruct the apparatus to receive a write end message from the graphics processing program after the graphics processing program completes a data write operation in the vertex buffer, an area of the data write operation being the data area corresponding to the offset and the length that are of the vertex buffer.

20. The computer program product of claim 14, wherein an entry address of the write function of the graphics driver is stored in the function stack.

\* \* \* \* \*